United States Patent
Bierhuizen et al.

(10) Patent No.: US 9,810,904 B1
(45) Date of Patent: Nov. 7, 2017

(54) FRESNEL LENS ASSEMBLY HAVING VARYING FACET ANGLE

(71) Applicant: Google Inc., Mountain View, CA (US)

(72) Inventors: Serge Bierhuizen, Mountain View, CA (US); Xinda Hu, Mountain View, CA (US); Jerome Carollo, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/383,219

(22) Filed: Dec. 19, 2016

Related U.S. Application Data

(60) Provisional application No. 62/420,942, filed on Nov. 11, 2016.

(51) Int. Cl.
| | |
|---|---|
| *G03B 21/60* | (2014.01) |
| *G02B 27/00* | (2006.01) |
| *G02B 5/04* | (2006.01) |
| *H04N 13/04* | (2006.01) |

(52) U.S. Cl.
CPC .......... *G02B 27/0025* (2013.01); *G02B 5/04* (2013.01); *H04N 13/044* (2013.01)

(58) Field of Classification Search
CPC ...... G03B 21/06; G03B 21/60; G03B 21/625; G02B 3/08; G02B 27/10; G02B 5/04; G02B 5/045; A61F 2/1656; G02C 7/14
USPC .......................................................... 359/457
See application file for complete search history.

(56) References Cited

U.S. PATENT DOCUMENTS

2013/0222757 A1* 8/2013 Klein et al. .............. G02C 7/14
351/111

* cited by examiner

*Primary Examiner* — Euncha Cherry

(57) ABSTRACT

A head mounted display device includes a display panel and a lens assembly mounted so that an optical axis of the lens assembly intersects the display panel. The lens assembly includes a lens body having a surface facing the display panel and defining Fresnel prisms. A Fresnel prism of the Fresnel prisms has a first facet angle when viewed in a first cross-section and has a second facet angle when viewed in a second cross-section parallel to the first cross-section. The first facet angle is different than the second facet angle.

20 Claims, 7 Drawing Sheets

A-A

FRESNEL LENS ASSEMBLY HAVING VARYING FACET ANGLE

FIELD OF THE DISCLOSURE

The present disclosure relates generally to virtual reality displays and, more particularly, to optical lens assemblies in virtual reality displays.

BACKGROUND

With increased utilization of visual media for work and entertainment, users are seeking realistic visual experiences, particularly those experiences incorporating a three-dimensional experience. As such, users are turning to virtual reality (VR) headsets and other three-dimensional (3-D) display technologies s. However, the nature of conventional lensing technologies introduces distortions, loss of focus, unwanted magnification, or undesirable field curvature in the field of vision, particularly along peripheral edges of the user's field of vision. Such distortions and aberrations degrade the quality of VR or 3-D experience, and in particular detract from the realism of a VR display. To compensate for distortions and aberrations, conventional 3-D display systems utilize complex electronic distortion correction and color correction techniques, resulting in increased latency in the display of imagery. Whether distortions, aberrations, or latency, the visual experience is degraded.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In a particular example, an apparatus includes a lens assembly that includes a lens body having a surface defining Fresnel prisms. The Fresnel prisms, sometimes referred to as grooves or segments, can have facet angles that change with position along the Fresnel prisms. For example, at a first position along a Fresnel prism, the Fresnel prism can have a first facet angle, and at a second position along the Fresnel prism, the Fresnel prism can have a second facet angle different from the first facet angle.

In an example, the lens assembly can be incorporated into a heads-up display that includes a display panel. The lens assembly is mounted to provide an optical axis of the lens assembly that intersects the display panel. The lens assembly can include an anamorphic X-Y lens body with anamorphic X-Y Fresnel prisms (facets angles changing along the (elliptical) groove/segments to enable localized control) or a thin stack of (elliptical) Fresnel prisms, e.g., one in the X-direction and one in the Y-direction with linear variable segment angle (corkscrew) type Fresnel prisms. The X and Y directions are orthogonal directions (e.g., left/right and up/down) in a plane of vision of the user. In particular, an apparatus incorporating the lens assembly provides for novel configurations, such as two-axis curvature of a lens body or integrated flat regions into a curved lens body, which enhance user experience and provide lower distortions.

Figure 1:
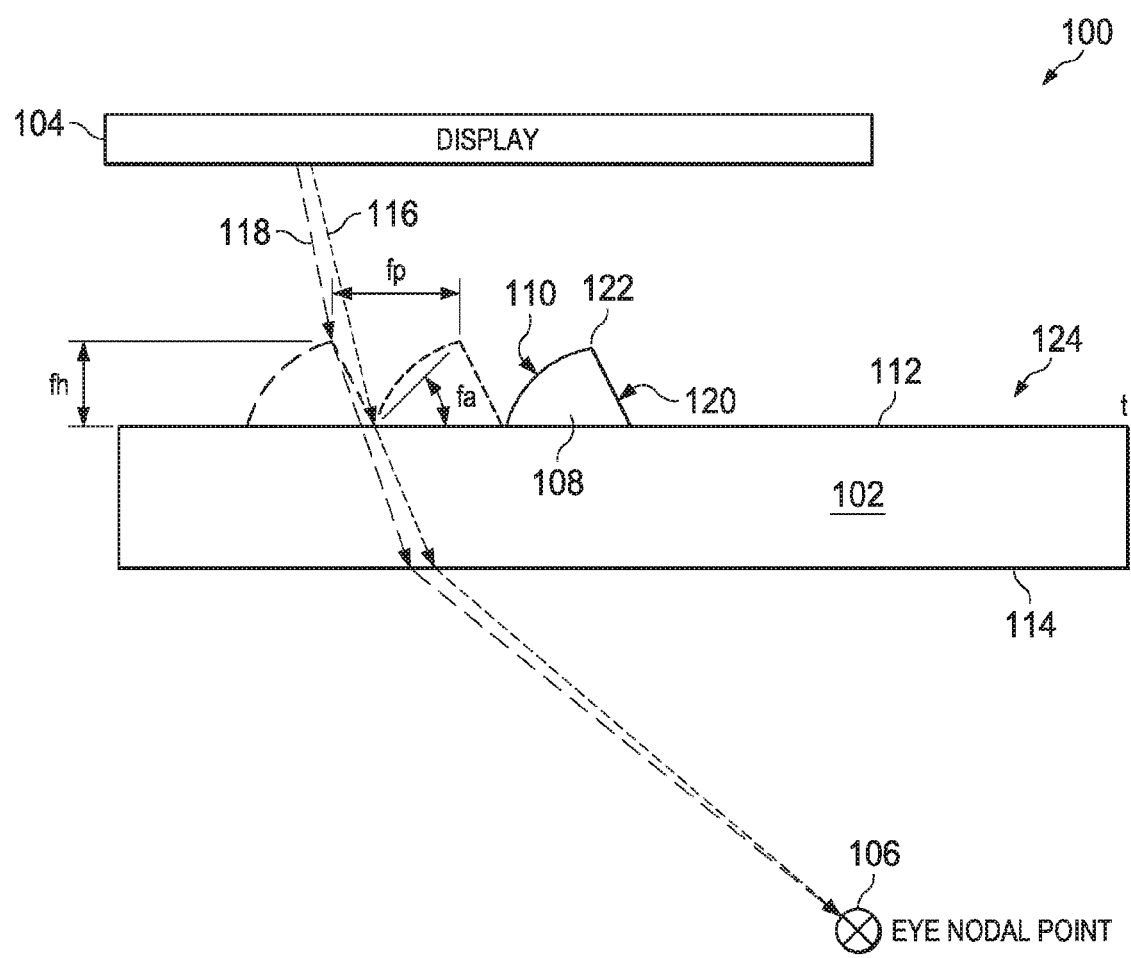
FIG. 1 is a cross-section view diagram of a near-eye display system employing a lens assembly with a Fresnel surface in accordance with some embodiments.

For example, as illustrated in FIG. 1, an apparatus includes a lens assembly 124 having a lens body 102, positioned between a display panel 104 and an eye nodal point 106. The lens body 102 has surfaces 112 and 114. As illustrated, the surface 112 defines Fresnel prisms 108. Light emanating from the display panel 104, such as rays 116 or 118, are refracted through the Fresnel prisms 108 toward the eye nodal point 106. When considered right to left from the orientation represented by FIG. 1, the ray 116 intersects as the last ray to hit a Fresnel prism, while the ray 118 is the first ray to hit the adjacent Fresnel prism, and both are directed towards the eye nodal point 106 to appear adjacent to each other at the eye nodal point 106.

The Fresnel prisms 108 include a light receiving surface 110 (or facet) that refracts light from the display panel 104 to the eye nodal point. The light receiving surface can be a flat surface or a curved surface. As illustrated, the refracting surface 110 is an aspherical surface. The light receiving surface 110 intersects a non-refracting facet 120 to form a ridge 122.

Each Fresnel prism 108 has a facet height (fh) and a facet angle (fa), and is separated from adjacent Fresnel prisms by a facet pitch (fp). The facet height (fh) is the height from the ridge 122 to a selected surface parallel to a centerline curve of the lens body 102, for example, illustrated as surface 112. The facet angle is the angle of a line extending along the refractive surface 110 from the ridge to a point at which the light receiving surface 110 contacts the surface 112 or the adjacent Fresnel prism measured relative to a line parallel to a tangent of a curve of the centerline of the lens body 102 or the surface 112. The pitch (fp) is the distance between ridges of adjacent Fresnel prisms.

While the lens body 102 is illustrated as having a single surface 112 that defines Fresnel prisms 108, in an alternative example, a second surface 114 can also define Fresnel prisms. Further, the surface 112 defining the Fresnel prisms is illustrated as facing the display panel 104 and opposite a surface facing the eye nodal point 106. In an alternative example, the surface 114 can define Fresnel prisms either as an alternative to or in addition to the Fresnel prisms defined by the surface 112.

To illustrate, the lens body 102 can be composed of optical plastic or glass, and the Fresnel surface 112 formed as part of a molding process when fabricating the lens assembly. Alternatively, the Fresnel surface 112 can be formed in a plastic or glass lens blank via, for example, embossing, laser ablation, or other machining techniques. Alternatively, the eye nodal point 106 may be formed by joining two separate Fresnel lenses, each having a Fresnel surface. For curved lens bodies described below, a curved lens assembly 106 can be fabricated to maintain the curved profile (e.g., by molding the lens body 102 using rigid material to rigidly maintain the curved profile), or the lens body 102 can be formed to be flexible and thus the lens body 102 can be mounted in a curved position so as to provide the desired curved profile.

In particular, when viewed in cross-sections at different positions along the lens body 102 (extending into the page as illustrated), the facet angle associated with the Fresnel prisms can change from one cross-section to another. Such changing facet angle allows for alternative structural configurations of the lens body.

Figure 2:
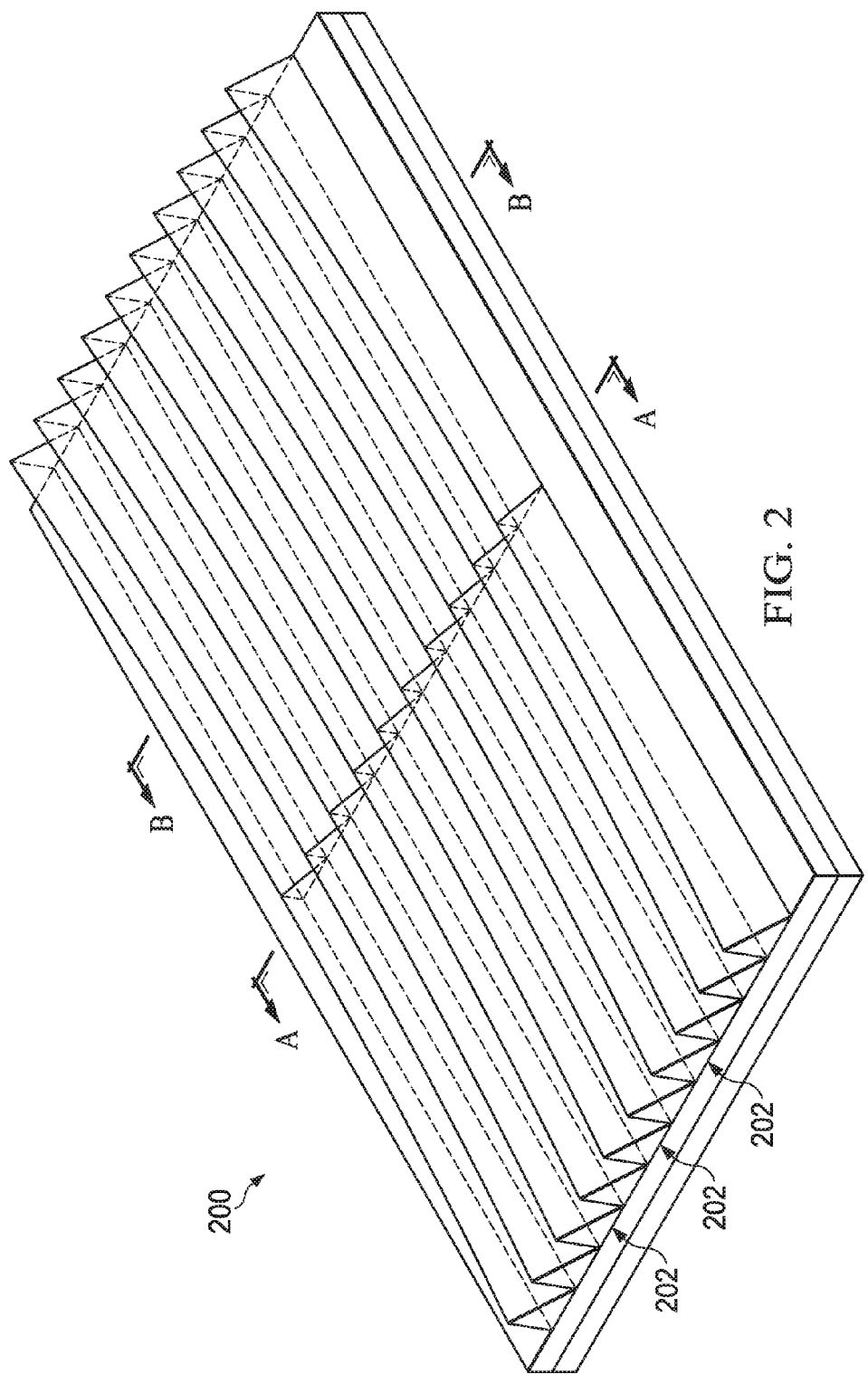
FIG. 2 is a diagram illustrating a lens body having a Fresnel surface in accordance with some embodiments.

In a further example illustrated in FIG. 2, a lens body 200 includes Fresnel prisms 202. When traversing along the Fresnel prisms, at different cross-sections, such as cross-section A-A or cross-section B-B, the facet angle of a given Fresnel prism is different. In the example illustrated in FIG. 2, the facet angle of a Fresnel prism is less when viewed in cross-section B-B than the facet angle of the Fresnel prism when viewed in cross-section A-A. In a particular example, the Fresnel prism has a linear variable facet angle.

Figure 3A:
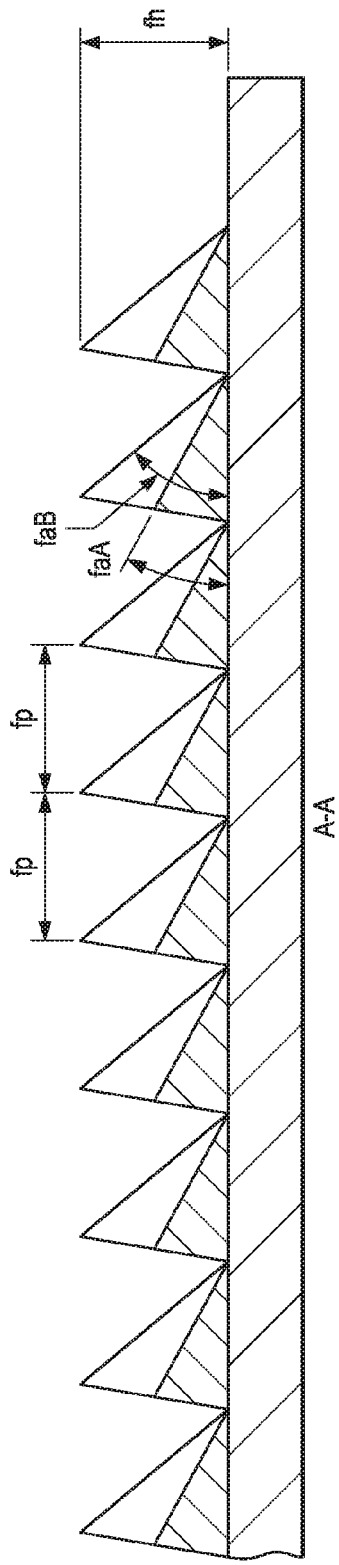
FIG. 3A and FIG. 3B are diagrams illustrating Fresnel surfaces of example lens bodies in accordance with some embodiments.

For example, as illustrated in FIG. 3A, the Fresnel prisms in cross-section A-A can have a facet angle (faA), and the Fresnel prisms in the cross-section B-B can have a different facet angle (faB). In an example, the facet angle faA is greater than the facet angle faB. Optionally, the pitch (fp) between adjacent Fresnel prisms can be constant. For example, for a select Fresnel prism, adjacent pairs of Fresnel prisms including the select Fresnel prism can have approximately equal pitch (fp). As used herein, the term "approximately equal" means equal within the bounds of manufacturing tolerances. Alternatively, the pitch can change.

Figure 3B:
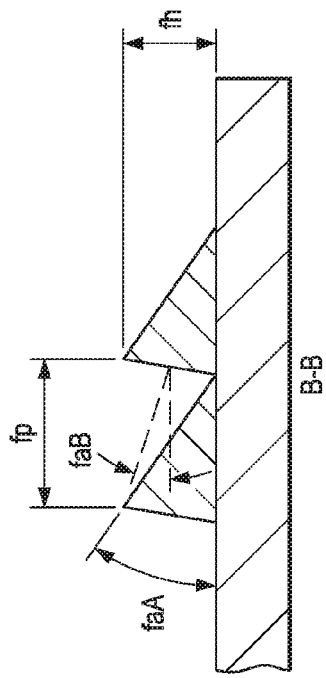

As illustrated in FIG. 3A, the facet height can change as a result of the changing facet angle. For example, in cross-section A-A, the facet height (fhA) is greater than the facet height (fhB) in cross-section B-B. Alternatively, as illustrated in FIG. 3B, the facet height (fh) relative to a surface parallel to a centerline of the lens body can remain constant as the facet angle changes from faA to faB. The parallel surface can be, for example, a surface parallel to a centerline of the lens body and passing through the lowest point between adjacent Fresnel prisms, for example, at a cross-section exhibiting greatest facet angle. In such an example, the pitch is illustrated as being constant or approximately equal between adjacent pairs of Fresnel prisms. Alternatively, the pitch is different at different positions and cross-sections of the lens body.

Figure 4:
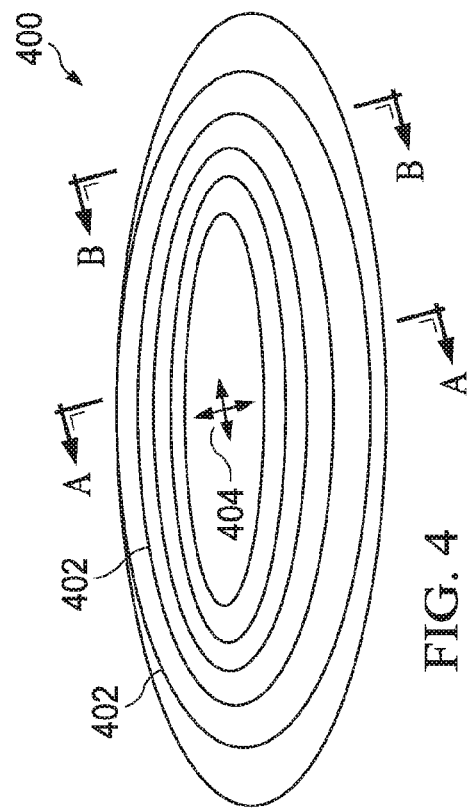
FIG. 4 is a diagram illustrating a lens body having a Fresnel surface in accordance with some embodiments.
Figure 5:
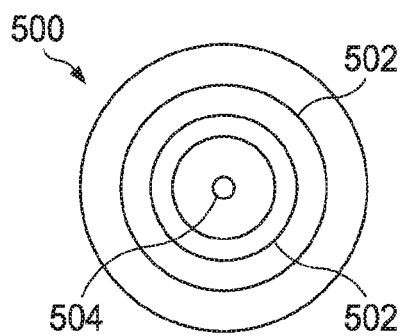
FIG. 5 and FIG. 6 are diagrams illustrating example orientations of Fresnel prims defined by a surface of a lens body in accordance with some embodiments.
Figure 6:
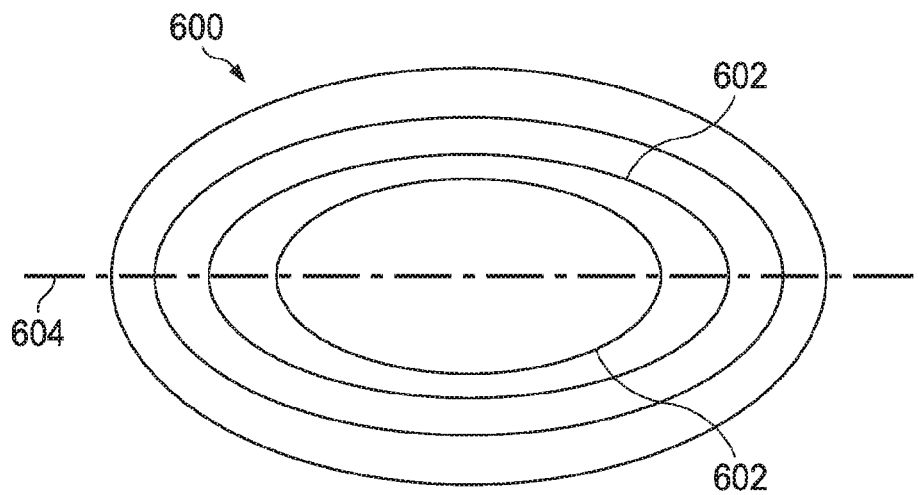

In particular, by utilizing Fresnel prisms having facet angles that change with position, alternative geometries of lens bodies can be utilized with less distortion or degradation of the user experience. For example, as illustrated in FIG. 4, a lens body 400 includes Fresnel prisms 402. The Fresnel prisms 402 can be formed to have ridges that form continuous loops in which the ridge of a Fresnel prism of the Fresnel prisms 402 loops back onto itself to form a continuous ridge. In an example, the ridges of the Fresnel prisms 402 can be concentric and circular. For example, as illustrated in FIG. 5, a set of Fresnel prisms 500 includes Fresnel prisms 502 that are circular and concentric around a central axis 504. In another example illustrated in FIG. 6, a lens body 600 includes Fresnel prisms 602 that have ridges that are elliptical in nature. The ellipses can have focal points that align with an axis 604. Alternatively, the ridges can be formed in irregular continuous curves from a top view.

Figure 7:
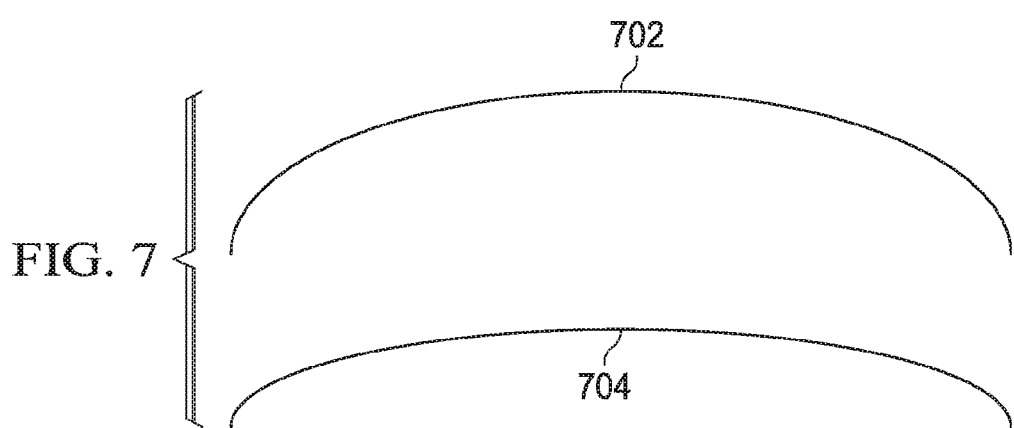
FIG. 7 is a diagram illustrating centerline curves of orthogonal cross-sections of a lens body in accordance with some embodiments.

Returning to FIG. 4, the lens 400 can further exhibit to axis curvature in which the lens body curves when viewed in both cross-sections of each orthogonal pair of cross-sections (e.g., cross-sections along orthogonal directions 404). The cross-sections are parallel to a thickness of a lens body. For example, as illustrated in FIG. 7, when viewed in a first cross-section, the lens body exhibits curvature 702. A centerline extending through the lens body curves as opposed to being flat. When an orthogonal cross-section is viewed, the lens body is also curved (see cross-section 704) as opposed to being flat, but to a different extent than the curvature exhibited by the first cross-section. The curves (702 or 704) when viewed in orthogonal cross-sections can be the same or different. In particular, the curvature of the cross-sections can be different.

Figure 8:
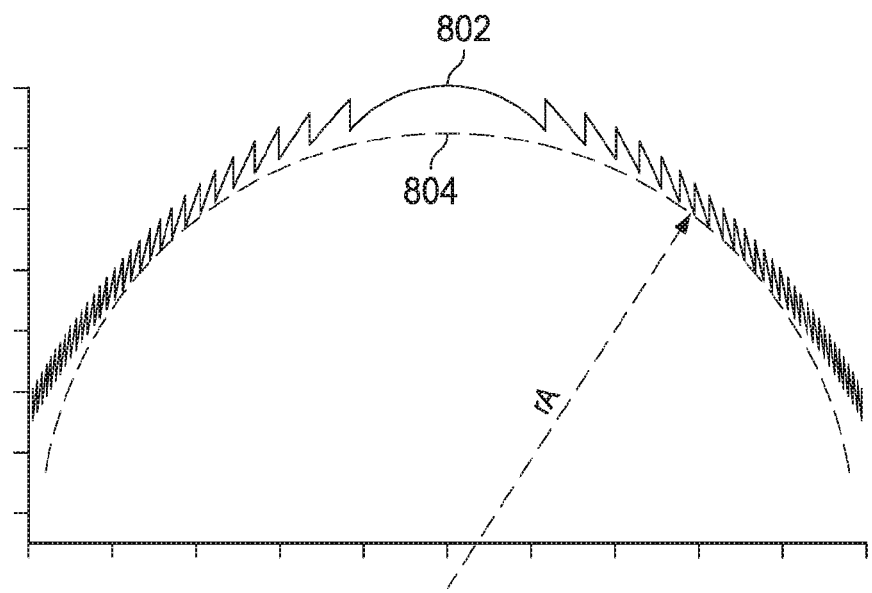
FIG. 8 and FIG. 9 are diagrams illustrating cross-sectional views of Fresnel surface configurations defined in a surface of a lens body at different locations in accordance with some embodiments.
Figure 9:
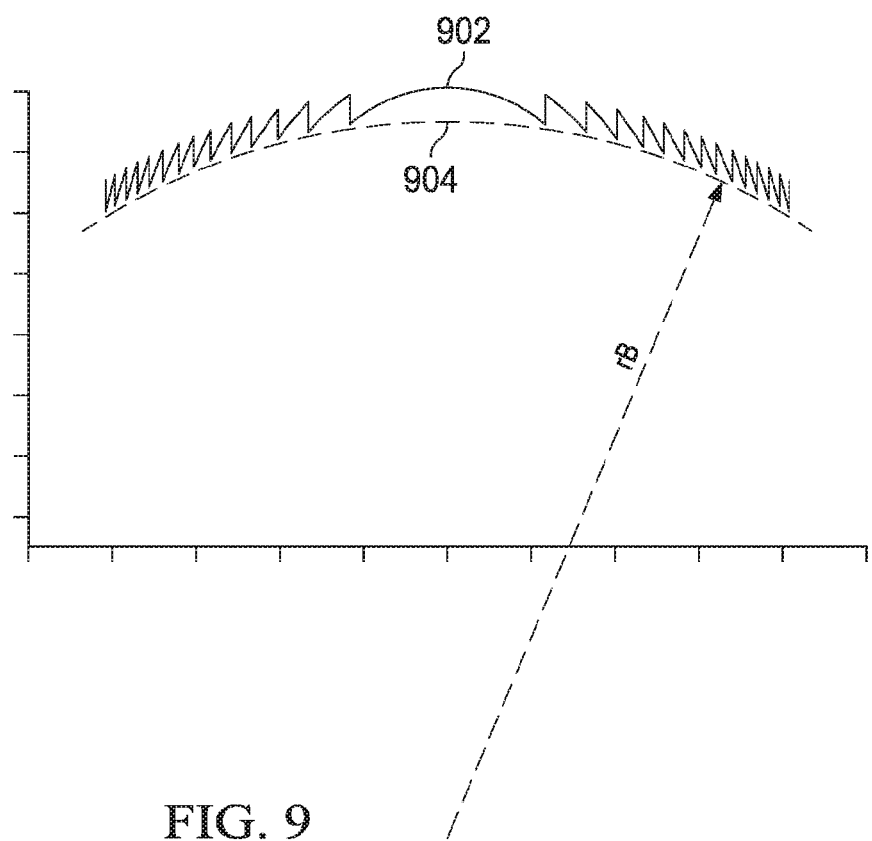

In another example, when viewing parallel cross-sections (e.g., cross-section A-A and cross-section B-B of FIG. 4), the lens curvature or the facet angles can change. For example, when viewing a cross-section of a lens body, a fitted radius of curvature can be determined. In an example illustrated in FIG. 8, a lens 400 when viewed in cross-section A-A has a radius of curvature ($r_A$). The lens body having facet Fresnel prisms 802 can be fitted to a circle 804 having a fitted radius of curvature $r_A$. At a different cross-section B-B of the lens 400 illustrated in FIG. 9, the lens can have Fresnel prisms 902 having a different facet angle. In cross-section B-B, a fitted circle 904 can be found for curvature of the lens 400 having a radius of curvature $r_B$. As illustrated, the radius $r_B$ is larger than the radius $r_A$. A radius ratio of the radii at the different positions can be defined. For example, a radius can be determined for the lens in the cross-section having a smallest radius and a radius can be determined for the lens at a parallel cross-section having a greatest radius. A radius ratio can be defined as the ratio of the smallest radius to the largest radius. In an example, the radius ratio of a given lens configuration can be not greater than 0.1, such as not greater than 0.05 or even not greater than 0.01. The radius of curvature fitted to a flat section would approach infinity. In a particular example, when the lens body is flat within the cross-section having the largest radius of curvature, the radius ratio approaches zero.

Figure 10:
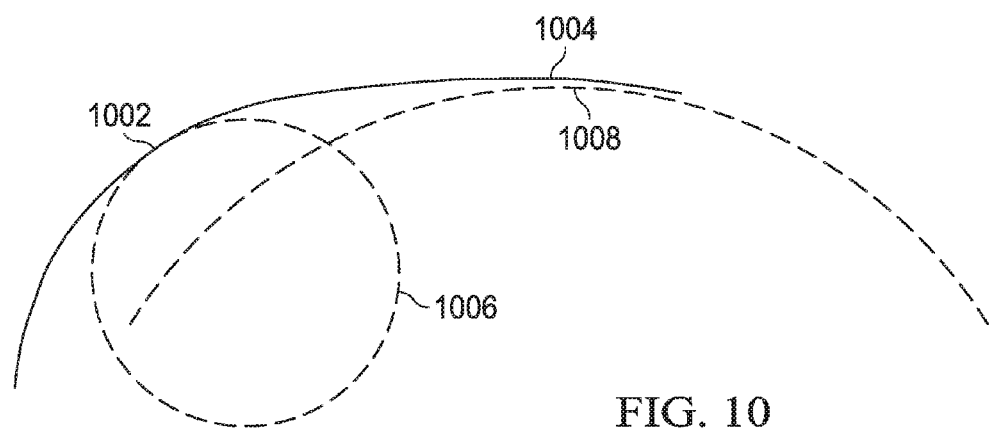
FIG. 10 is a diagram illustrating the change in fitted radius of curvature of a centerline curve of a lens body in accordance with some embodiments.

In another example illustrated in FIG. 10, when viewing a lens from a cross-section orthogonal to cross-sections A-A and B-B, a lens 1000 can exhibit curved areas 1002 fitted to circle 1006 having a small radius of curvature, whereas other areas along the cross-section 10104 fitted to a circle 1008 can exhibit a large radius of curvature and can be approximately flat. Such geometry when used in cooperation with the display panel can further enhance the three-dimensional experience, for example, when using a virtual reality headset.

Figure 11:
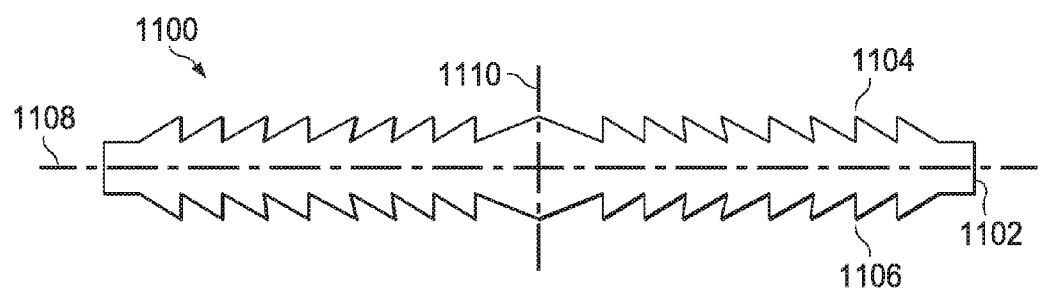
FIG. 11 is a diagram illustrating a lens body including opposing Fresnel surfaces in accordance with some embodiments.

While the above-described lens bodies are illustrated as having a single surface defining Fresnel prisms, the lens body alternatively can have two surfaces, each defining Fresnel prisms. For example, as illustrated in FIG. 11, a lens assembly 1100 includes a lens body 1102 having a centerline 1108. One major surface 1104 defines Fresnel prisms. Similarly, an opposite surface 1106 can define Fresnel prisms. The Fresnel prisms on one or both surfaces can exhibit different facet angles in different cross-sections. Further, when viewed from the centerline 1108, the lens 1102 is illustrated as being straight. Alternatively, the centerline 1108 can be curved when viewing another cross-section. As illustrated, the Fresnel prisms are a structural reflection of the facet angles of the Fresnel prisms on an opposite side of a center axis 1110. In other words, a Fresnel prism on a first side of the center axis 1110 is symmetric with a Fresnel prism on the second side of the center axis 1110; one Fresnel prism having approximately equal facet angel as the other Fresnel prism while facing in an opposite direction. Alternatively, the facet angles are asymmetric with respect to the center axis 1110. In a further alternative, two lens bodies can be used in conjunction to define the two opposing surfaces having frontal prisons.

In a particular example, one surface can define elliptical Fresnel prisms having a first axis extending through the focal points of the ellipses, and a second surface, either formed on the same lens body or a separate lens body, can define elliptical Fresnel prisms having a second axis extending through the focal points of the elliptical Fresnel prisms defined by the second surface. The first axis and the second axis can be orthogonal. For example, the first axis can extend left/right, and the second axis can extend up/down from the perspective of a viewer.

Figure 12:
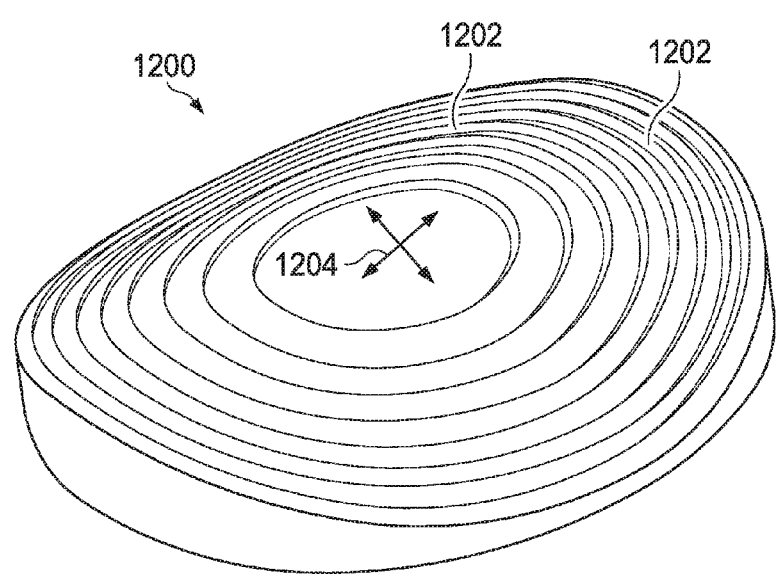
FIG. 12 and FIG. 13 are diagrams illustrating an anamorphic lens body in accordance with some embodiments.
Figure 13:
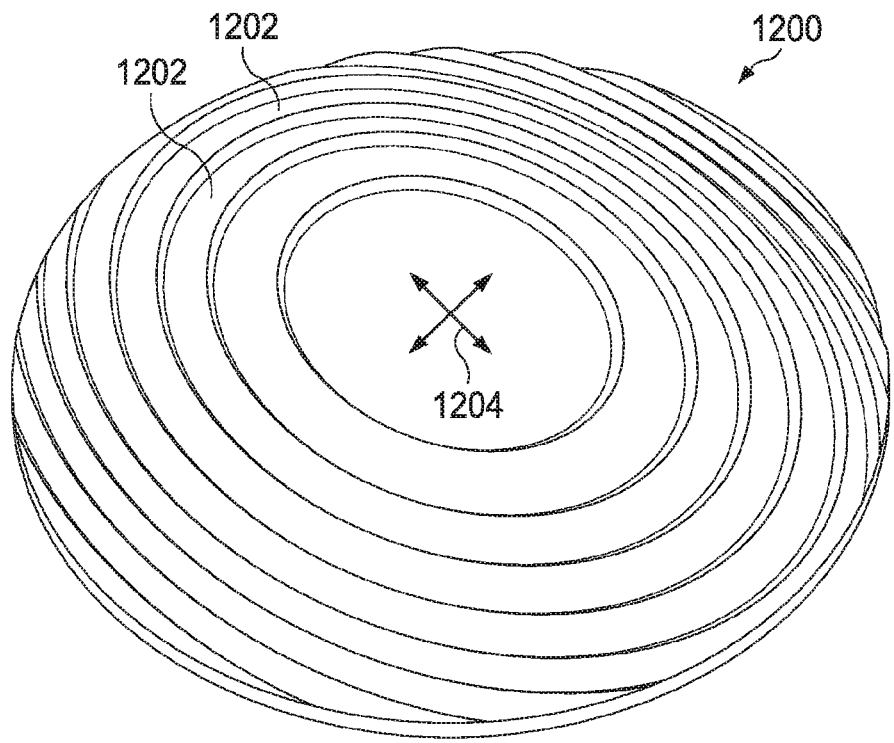

In another example, as illustrated in FIG. 12 and FIG. 13, a lens body 1200 can include a plurality of Fresnel prisms 1202 forming continuous ridges that loopback on themselves. Such a lens 1200 can have two axis curvature in which, when viewed in each pair of orthogonal cross-sections, the lens body exhibits a curvature (e.g., is not flat). Alternatively, such a lens body can exhibit multi-axis curvature at particular points along the lens body, while exhibiting single axis curvature or flat regions having no curvature along at least one orthogonal cross-section. In a particular example, a lens body 1200 can be formed as an anamorphic lens that includes facet prisms with different facet angles at different positions extending along the Fresnel prism. In an example, Fresnel prisms can have approximately equal facet heights in both the first and second positions. Adjacent pairs of Fresnel prisms can have an approximately equal facet pitch.

In a particular example, the Fresnel prisms 1202 have a facet angle (fa) in a range of 0° to 80°, such as a range of 10° to 80°, a range of 20° to 70°, or a range of 25° to 70°. In a further example, the Fresnel prisms 1202 have a pitch (fp) in a range of 100 micrometers to 3 millimeters, such as a range of 500 micrometers to 2 mm, or a range of 500 micrometers to 1 mm. The Fresnel prisms can 1202 can have a draft angle (the angle defined between a vertical line extending into the lens from a peak and a non-refracting face) in a range of −20° to 60°.

Figure 14:
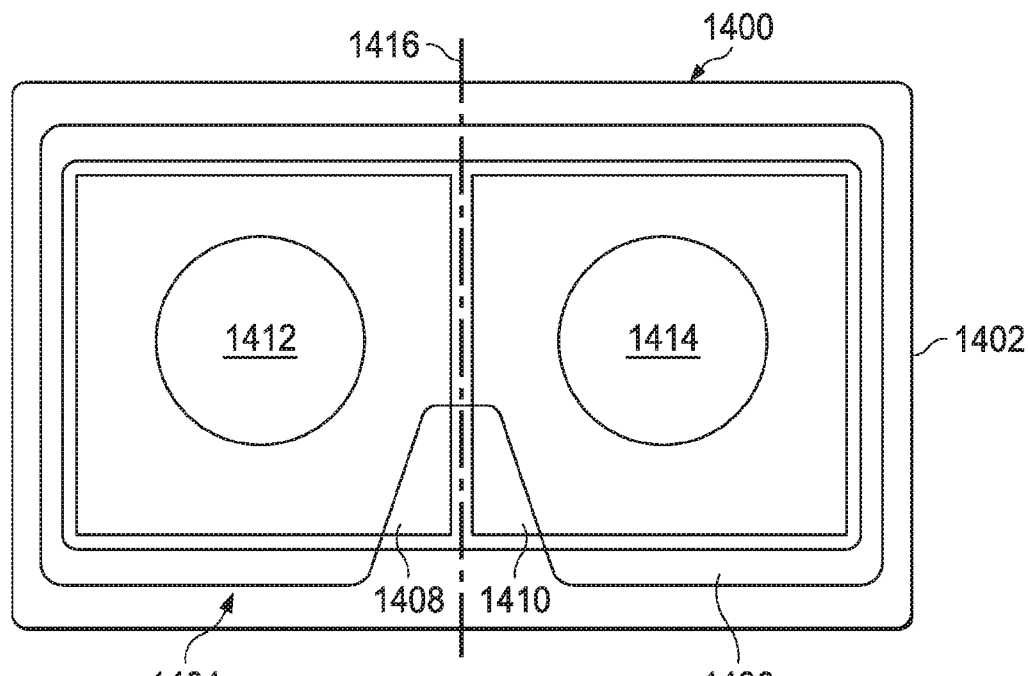
FIG. 14 is a diagram illustrating a rear view of a head mounted display (HMD) device implementing lens assemblies in accordance with at least one embodiment of the present disclosure.

FIG. 14 illustrates an example head mounted display (HMD) device 1400 configured to implement the near-eye display system 100 in accordance with at least one embodiment. The HMD device 1400 is mounted to the head of the user through the use of an apparatus strapped to, or otherwise mounted on, the user's head such that the HMD device 1400 is fixedly positioned in proximity to the user's face and thus moves with the user's movements. However, in some circumstances a user may hold a tablet computer or other hand-held device up to the user's face and constrain the movement of the hand-held device such that the orientation of the hand-held device to the user's head is relatively fixed even as the user's head moves. In such instances, a handheld device operated in this manner also may be considered an implementation of the HMD device 1400 even though it is not "mounted" via a physical attachment to the user's head.

The HMD device 1400 comprises a housing 1402 having a surface 1404, and a face gasket 1406 and set of straps or a harness (omitted from FIG. 14 for clarity) to mount the housing 1402 on the user's head so that the user faces the surface 1404 of the housing 1402. In the depicted embodiment, the HMD device 1400 is a binocular HMD and thus has a left-eye display panel 1408 and a right-eye display panel 1410 disposed at the surface 1404 (with displays panels 1408, 1410 collectively or separately representing an embodiment of the display panel 104 of FIG. 1). The display panels 1408, 1410 may be implemented as separate display panels (that is independent display arrays driven by separate display driver hardware components) or the display panels 1408, 1410 may be implemented as logically-separated regions of a single display panel (e.g., a single display array logically divided into left and right "halves"). The housing 1402 further includes an eyepiece lens assembly 1412 aligned with the left-eye display panel 1408 and an eyepiece lens assembly 1414 aligned with the right-eye display panel 1410. Alternatively, in some embodiments, the HMD device 1400 may be implemented as a monocular HMD in that a single image is presented to both eyes of the user, either through left and right eyepiece lens assemblies 1412, 1414, or directly without an intervening lens. The lens assemblies 1412, 1414 each may implement any of the lens assemblies disclosed herein, such as lens assembly 124, 200, 400, 1100, 1200, or combinations thereof. In an example, the lens assemblies can be structurally a reflection of one another across a plane 1416 defined vertically and extending into the paper as illustrated in FIG. 14. In other words, the lens assemblies have structures that are a reflection of each other relative to the plane 1416. Thus, the lens assemblies 1412, 1414 may exhibit net field curvatures that are well matched to the display panels 1408, 1410, which may be substantially flat, curved, or a combination thereof. In particular, the Fresnel prisms are defined by a surface of the lens assemblies 1412 or 1414 that face the display panel 1408 or 1410. Accordingly, the HMD device 1400 may exhibit reduced focus aberrations and other aberrations or distortions that otherwise would be present in HMD implementations utilizing conventional lenses.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. An apparatus comprising:
   a lens assembly comprising a lens body having a first surface defining Fresnel prisms; and
   wherein a Fresnel prism of the Fresnel prisms has a first facet angle when viewed in a first cross-section and has a second facet angle when viewed in a second cross-section parallel to the first cross-section, the first facet angle different than the second facet angle.

2. The apparatus of claim 1, the Fresnel prism has equal facet heights in the first and second cross-sections.

3. The apparatus of claim 1, wherein Fresnel prisms adjacent the Fresnel prism have approximately equal facet heights as the Fresnel prism.

4. The apparatus of claim 1, wherein pitches between adjacent pairs of Fresnel prisms including the Fresnel prism are approximately equal.

5. The apparatus of claim 1, wherein the Fresnel prism extends in a loop.

6. The apparatus of claim 5, wherein the Fresnel prism extends in a circle.

7. The apparatus of claim 5, wherein the Fresnel prism extends in an ellipse.

8. The apparatus of claim 1, wherein the lens body is curved in each orthogonal pair of cross-sections intersecting at a location within the lens body.

9. The apparatus of claim 1, wherein the lens body has a first fitted radius of curvature in the first cross-section and a second fitted radius of curvature in the second cross-section, the first fitted radius smaller than the second fitted radius.

10. The apparatus of claim 9, wherein a radius ratio of the first fitted radius to the second fitted radius is not greater than 0.1.

11. The apparatus of claim 10, wherein the radius ratio is not greater than 0.05.

12. The apparatus of claim 1, wherein the lens body is anamorphic.

13. The apparatus of claim 1, wherein the lens body further comprises second Fresnel prisms defined by a second surface opposite the first surface.

14. The apparatus of claim 13, wherein a second Fresnel prism of the second Fresnel prisms has a third facet angle when viewed in a third cross-section and has a fourth facet angle when viewed in a fourth cross-section parallel to the third cross-section, the third facet angle different than the fourth facet angle.

15. The apparatus of claim 1, wherein the Fresnel prism has a linear variable facet angle.

16. The apparatus of claim 1, further comprising:
   a head mounted display device comprising:
      a display panel; and
      the lens assembly mounted so that an optical axis of the lens assembly intersects the display panel.

17. The apparatus of claim 16, wherein the first surface defining the Fresnel prisms faces the display panel.

18. The apparatus of claim 16, further comprising a second lens assembly wherein the second lens assembly has a structure that is a reflection of the lens assembly.

19. The apparatus of claim 16, wherein the lens assembly further comprises a second lens body having a second surface defining Fresnel prisms.

20. The apparatus of claim 19, wherein the lens body and the second lens body provide the optical axis, and wherein the Fresnel prisms of the lens body are elliptical Fresnel prisms having a first axis and the Fresnel prisms of the second lens body are elliptical Fresnel prisms having a second axis.

* * * * *